US010017702B2

(12) United States Patent
Sundaram

(10) Patent No.: US 10,017,702 B2
(45) Date of Patent: Jul. 10, 2018

(54) THERMAL CRACKING OF CRUDES AND HEAVY FEEDS TO PRODUCE OLEFINS IN PYROLYSIS REACTOR

(71) Applicant: Lummus Technology Inc., Bloomfield, NJ (US)

(72) Inventor: Kandasamy Meenakshi Sundaram, Old Bridge, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 286 days.

(21) Appl. No.: 14/874,755

(22) Filed: Oct. 5, 2015

(65) Prior Publication Data

US 2016/0097002 A1    Apr. 7, 2016

Related U.S. Application Data

(60) Provisional application No. 62/060,815, filed on Oct. 7, 2014.

(51) Int. Cl.
*C10G 9/36* (2006.01)
*B01J 19/24* (2006.01)
*B01J 6/00* (2006.01)

(52) U.S. Cl.
CPC .............. *C10G 9/36* (2013.01); *B01J 6/008* (2013.01); *B01J 19/2425* (2013.01); *B01J 2219/00157* (2013.01); *B01J 2219/00159* (2013.01)

(58) Field of Classification Search
CPC ........ C10G 2400/20; C10G 9/20; C10G 9/36; B01J 19/2425; B01J 2219/00157; B01J 2219/00159; B01J 6/008
See application file for complete search history.

(56) References Cited

U.S. PATENT DOCUMENTS

| | | | |
|---|---|---|---|
| 3,617,493 A | 11/1971 | Wirth et al. | |
| 5,190,634 A | 3/1993 | Fernandez-Baujin et al. | |
| 5,580,443 A | 12/1996 | Yoshida et al. | |
| 6,743,961 B2 | 6/2004 | Powers | |
| 6,979,757 B2 | 12/2005 | Powers | |
| 7,374,664 B2 | 5/2008 | Powers | |
| 7,550,642 B2 | 6/2009 | Powers | |
| 8,083,932 B2 | 12/2011 | Baumgartner et al. | |
| 8,658,019 B2 | 2/2014 | Bridges et al. | |
| 8,658,022 B2 | 2/2014 | Bridges et al. | |
| 8,658,023 B2 | 2/2014 | Coleman | |

(Continued)

FOREIGN PATENT DOCUMENTS

| | | |
|---|---|---|
| EA | 14787 B1 | 2/2011 |
| RU | 2232790 C2 | 7/2004 |

(Continued)

OTHER PUBLICATIONS

Reexamination Notice dated Apr. 12, 2016 in corresponding Taiwan application No. 104133021 (w/translation) (8 pages).

(Continued)

*Primary Examiner* — Sharon Pregler
(74) *Attorney, Agent, or Firm* — Osha Liang LLP

(57) ABSTRACT

Systems and processes for efficiently cracking of hydrocarbon mixtures, such as mixtures including compounds having a normal boiling temperature of greater than 450° C., 500° C., or even greater than 550° C., such as whole crudes for example, are disclosed.

20 Claims, 5 Drawing Sheets

(56) References Cited

U.S. PATENT DOCUMENTS

| | | | |
|---|---|---|---|
| 2007/0215524 A1 | 9/2007 | Stell et al. | |
| 2007/0232846 A1 | 10/2007 | Baumgartner et al. | |
| 2009/0054716 A1* | 2/2009 | Baumgartner | C10G 9/20 585/648 |
| 2012/0125811 A1 | 5/2012 | Bridges et al. | |

FOREIGN PATENT DOCUMENTS

| | | |
|---|---|---|
| RU | 2008138863 A | 4/2010 |
| WO | 2009025640 A1 | 2/2009 |

OTHER PUBLICATIONS

International Search Report and Written Opinion dated Jan. 22, 2016 in corresponding International application No. PCT/US2015/054232 (14 pages).

International Preliminary Report on Patentability issued in corresponding International Application No. PCT/US2015/054232 dated Apr. 20, 2017 (10 pages).

Office Action issued in corresponding Russian Application No. 2017115768/04 dated Feb. 28, 2018, and English translation thereof (19 pages).

\* cited by examiner

THERMAL CRACKING OF CRUDES AND HEAVY FEEDS TO PRODUCE OLEFINS IN PYROLYSIS REACTOR

FIELD OF THE DISCLOSURE

Embodiments disclosed herein relate generally to the thermal cracking of hydrocarbon mixtures, such as whole crudes or other hydrocarbon mixtures, to produce olefins.

BACKGROUND

Hydrocarbon mixtures having an end boiling point over 550° C. are generally not processed directly in a pyrolysis reactor to produce olefins, as the reactor cokes fairly rapidly. While limiting reaction conditions may reduce the fouling tendency, the less severe conditions result in a significant loss in yield.

The general consensus in the art is that hydrocarbon mixtures having a wide boiling range and/or hydrocarbons having a high end boiling point require an initial separation of the hydrocarbons into numerous fractions, such as gas/light hydrocarbons, naphtha range hydrocarbons, gas oil, etc., and then cracking each fraction under conditions specific for those fractions, such as in separate cracking furnaces. While the fractionation, such as via a distillation column, and separate processing may be capital and energy intensive, it is generally believed that the separate and individual processing of the fractions provides the highest benefit with respect to process control and yield.

SUMMARY OF THE DISCLOSURE

Processes have now been developed for flexibly processing whole crudes and other hydrocarbon mixtures containing high boiling coke precursors. Embodiments herein may advantageously reduce coking and fouling during the cracking process, even at high severity conditions, and attain desirable yields, while significantly decreasing the capital and energy requirements associated with pre-fractionation and separate processing.

In one aspect, embodiments disclosed herein relate to a process for thermally cracking a hydrocarbon mixture to produce olefins. The process may include heating a hydrocarbon mixture to vaporize a portion of the hydrocarbons in the hydrocarbon mixture. The heated hydrocarbon mixture may then be separated, in a first separator, into a first vapor fraction and a first liquid fraction. The first liquid fraction may be heated in a convection zone of a pyrolysis reactor to vaporize a portion of the hydrocarbons in the first liquid fraction and form a second heated hydrocarbon mixture. The second heated hydrocarbon mixture may then be separated, in a second separator, into a second vapor fraction and a second liquid fraction. Steam may be mixed with the first vapor fraction, and the resulting mixture may be heated in the convection zone, and fed to a first radiant coil in a radiant zone of the pyrolysis reactor for cracking of the hydrocarbons to produce olefins. The second vapor fraction may also be mixed with steam, superheated in the convection zone, and fed to a second radiant coil in a radiant zone of the pyrolysis reactor for production of additional olefins.

In another aspect, embodiments disclosed herein relate to a system for thermally cracking a hydrocarbon mixture to produce olefins. The system may include: a heater and a pyrolysis reactor comprising a radiant zone and a convection zone. The system also includes first indirect heat exchange coil for heating a hydrocarbon mixture in the heater forming a heated hydrocarbon mixture; a first separator for separating the heated hydrocarbon mixture into a first vapor fraction and a first liquid fraction; a second indirect heat exchange coil for heating the first liquid fraction in the convection zone forming a second heated hydrocarbon mixture; a second separator for separating the second heated hydrocarbon mixture into a second vapor fraction and a second liquid fraction; a third and fourth indirect heat exchange coils for superheating the first and second vapor fractions, respectively, in the convection zone; a first radiant coil in a radiant zone of the pyrolysis reactor for thermally cracking hydrocarbons in the superheated first vapor fraction; and a second radiant coil in a radiant zone of the pyrolysis reactor for thermally cracking hydrocarbons in the superheated second vapor fraction.

A system for cracking a hydrocarbon mixture to produce olefins according to embodiments herein may thus include a heater and a pyrolysis reactor having a radiant zone and a convection zone. The heater includes a first indirect heat exchange coil having an inlet and an outlet. The inlet may be fluidly connected to a hydrocarbon mixture source, and the outlet may be fluidly connected to a first separator. The first separator may include a vapor outlet and a liquid outlet and may be used, for example, to separate a heated hydrocarbon from the heater into a first vapor fraction and a first liquid fraction. The pyrolysis reactor may include multiple indirect heat exchange coils in the convection zone, as well as multiple indirect heat exchange coils in the radiant zone. For example, a second indirect heat exchange coil may have an inlet, fluidly connected to the liquid outlet of the first separator, and an outlet, fluidly connected to an inlet of a second separator. The second separator may also have a vapor outlet and a liquid outlet. A third and fourth indirect heat exchange coils may each include an inlet and an outlet, the inlets respectively fluidly connected to the vapor outlet of the first separator and the vapor outlet of the second separator. The third and fourth indirect heat exchange coils may be used, for example, to superheat the respective vapor fractions in the convective zone of the pyrolysis heater. The outlets of the third and fourth indirect heat exchange coils may be respectively fluidly connected to an inlet of a first radiant coil and a second radiant coil, each within the radiant zone of the pyrolysis reactor. Each of the first and second radiant coils may also include an outlet. The radiant coils may be used, for example, to thermally crack hydrocarbons in the superheated vapor fractions, and to allow recovery of the cracked product for further processing.

In another aspect, embodiments disclosed herein relate to a process for thermally cracking a hydrocarbon mixture, comprising hydrocarbons boiling from naphtha range hydrocarbons to hydrocarbons boiling at a temperature greater than 550° C., to produce olefins. The process may include: heating a hydrocarbon mixture in a convection zone of a pyrolysis reactor to vaporize a portion of the hydrocarbons in the hydrocarbon mixture and form a heated hydrocarbon mixture; separating the heated hydrocarbon mixture, in a first separator, into a first vapor fraction comprising naphtha range hydrocarbons and a first liquid fraction; mixing the first liquid fraction with steam to form a first steam/oil mixture; heating the first steam/oil mixture in the convection zone of the pyrolysis reactor to vaporize a portion of the hydrocarbons in the first steam/oil mixture and form a second heated hydrocarbon mixture; separating the second heated hydrocarbon mixture, in a second separator, into a second vapor fraction comprising gas oil range hydrocarbons and a second liquid fraction; mixing steam with the first vapor fraction, superheating the resulting mixture in the convection zone, and feeding the superheated mixture to a first radiant coil in a radiant zone of the pyrolysis reactor; and mixing steam with the second vapor fraction, superheating the resulting mixture in the convection zone, and feeding the superheated mixture to a second radiant coil in a radiant zone of the pyrolysis reactor.

In another aspect, embodiments disclosed herein relate to a system for cracking a hydrocarbon mixture to form olefins. The system may include: a first heater comprising a radiant zone and a convection zone; one or more second heaters comprising a radiant zone and a convection zone; a first heating coil disposed in the convection zone of the first heater for partially vaporizing a mixed hydrocarbon feed; a first separation system for separating the partially vaporized mixed hydrocarbon feed into a first vapor fraction and a first liquid fraction; a second heating coil disposed in the convection zone of the first heater for partially vaporizing the first liquid fraction; a second separation system for separating the partially vaporized first liquid fraction into a second vapor fraction and a second liquid fraction; a third heating coil disposed in the convection zone of the first heater for partially vaporizing the second liquid fraction; a third separation system for separating the partially vaporized second liquid fraction into a third vapor fraction and a third liquid fraction; a first radiant coil disposed in the radiant zone of one of the one or more second heaters for cracking the first vapor fraction to form olefins; and a second radiant coil disposed in the radiant zone of one of the one or more second heaters for cracking the second vapor fraction to form olefins.

A system for cracking a hydrocarbon mixture to produce olefins according to various embodiments herein may thus include a first heater having a radiant zone and a convection zone and one or more second heaters including a radiant zone and a convection zone. The first heater may include multiple indirect heat exchange coils, each having an inlet and an outlet, in the convection zone of the heater. The inlet of a first coil may be fluidly connected, for example, to a hydrocarbon mixture source, and the outlet of the first coil may be fluidly connected to a first separator. The inlet of a second coil may be fluidly connected to a liquid outlet of the first separator, and the outlet of the second coil may be fluidly connected to a second separator. The inlet of a third coil may be fluidly connected to a liquid outlet of the second separator, and the outlet of the third coil may be fluidly connected to a third separator. The one or more second heaters may include radiant coils, each having an inlet and an outlet, in the respective radiant zones. An inlet of first radiant coil may be fluidly connected to a vapor outlet of the first separator. An inlet of a second radiant coil may be fluidly connected to a vapor outlet of the second separator. The radiant coils may be used, for example, to crack hydrocarbons in the respective vapor fractions, and the outlets may allow recovery of the cracked product for further processing.

In another aspect, embodiments disclosed herein relate to a process, including: generating a first flue gas in a first heater; generating a second flue gas in a second heater; recovering heat from the first flue gas in a convection zone of the first heater, thereby cooling the second flue gas; recovering heat from the second flue gas in a convection zone of the second heater, thereby cooling the second flue gas; combining the cooled first and second flue gases to form a combined flue gas stream; and recovering heat from the combined flue gas stream.

The process flow diagram shown in the attached sketches can be slightly modified for specific crudes and product slates. Other aspects and advantages will be apparent from the following description and the appended claims.

DETAILED DESCRIPTION

Figure 1:
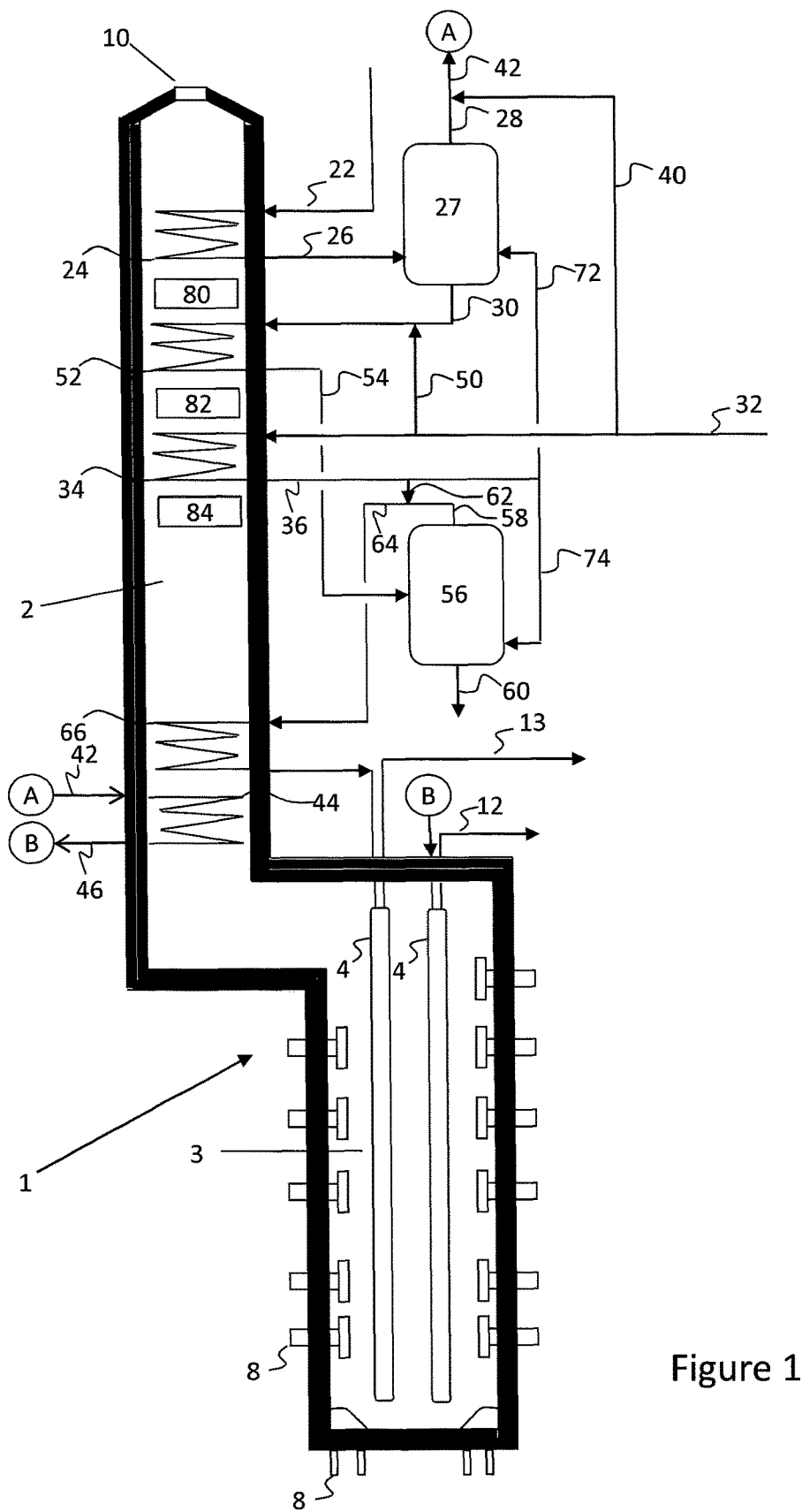
FIG. 1 is a simplified process flow diagram of a system for cracking hydrocarbon mixtures according to embodiments herein.

Embodiments disclosed herein relate generally to the thermal cracking of hydrocarbon mixtures, such as whole crudes or other hydrocarbon mixtures, to produce olefins. More specifically, embodiments disclosed herein relate to the efficient separation of hydrocarbon mixtures using heat recovered from a convective section of a heater in which the cracking is being performed.

Hydrocarbon mixtures useful in embodiments disclosed herein may include various hydrocarbon mixtures having a boiling point range, where the end boiling point of the mixture may be greater than 450° C. or greater than 500° C., such as greater than 525° C., 550° C., or 575° C. The amount of high boiling hydrocarbons, such as hydrocarbons boiling over 550° C., may be as little as 0.1 wt %, 1 wt % or 2 wt %, but can be as high as 10 wt %, 25 wt %, 50 wt % or greater. The description is explained with respect to crude, but any high boiling end point hydrocarbon mixture, such as crudes and condensates, can be used. The Examples below are described with respect to a light Arab crude and an Agbami crude for illustrative purposes, but the scope of the present application is not limited to such crudes. Processes disclosed herein can be applied to crudes, condensates and hydrocarbon with a wide boiling curve and end points higher than 500° C. Such hydrocarbon mixtures may include whole crudes, virgin crudes, hydroprocessed crudes, gas oils, vacuum gas oils, heating oils, jet fuels, diesels, kerosenes, gasolines, synthetic naphthas, raffinate reformates, Fischer-Tropsch liquids, Fischer-Tropsch gases, natural gasolines, distillates, virgin naphthas, natural gas condensates, atmospheric pipestill bottoms, vacuum pipestill streams including bottoms, wide boiling range naphtha to gas oil condensates, heavy non-virgin hydrocarbon streams from refineries, vacuum gas oils, heavy gas oils, atmospheric residuum, hydrocracker wax, and Fischer-Tropsch wax, among others. In some embodiments, the hydrocarbon mixture may include hydrocarbons boiling from the naphtha range or lighter to the vacuum gas oil range or heavier. If desired, these feeds may be pre-processed to remove a portion of the sulfur, nitrogen, metals, and Conradson Carbon upstream of processes disclosed herein.

As noted above, when the end boiling point of the hydrocarbon mixture is high, such as over 550° C., the hydrocarbon mixture cannot be processed directly in a pyrolysis reactor to produce olefins. The presence of these heavy hydrocarbons results in the formation of coke in the reactor, where the coking may occur in one or more of the convection zone preheating coils or superheating coils, in the radiant coils, or in transfer line exchangers, and such coking may occur rapidly, such as in few hours. Whole crude is not cracked commercially, as it is not economical. It is generally fractionated, and only specific cuts are used in a pyrolysis heater to produce olefins. The remainder is used in other processes.

The cracking reaction proceeds via a free radical mechanism. Hence, high ethylene yield can be achieved when it is cracked at high temperatures. Lighter feeds, like butanes and pentanes, require a high reactor temperature to obtain high olefin yields. Heavy feeds, like gas oil and vacuum gas oil (VGO), require lower temperatures. Crude contains a distribution of compounds from butanes to VGO and residue (material having a normal boiling point over 550° C.). Subjecting the whole crude without separation at high temperatures produces a high yield of coke (byproduct of cracking hydrocarbons at high severity) and plugs the reactor. The pyrolysis reactor has to be periodically shut down and the coke is cleaned by steam/air decoking. The time between two cleaning periods when the olefins are produced is called run length. When crude is cracked without separation, coke can deposit in the convection section coils (vaporizing the fluid), in the radiant section (where the olefin producing reactions occur) and/or in the transfer line exchanger (where the reactions are stopped quickly by cooling to preserve the olefin yields).

Embodiments disclosed herein use the convection section of a pyrolysis reactor (or a heater) to preheat and separate the feed hydrocarbon mixture into various fractions. Steam may be injected at appropriate locations to increase the vaporization of the hydrocarbon mixture and to control the heating and degree of separations. The vaporization of the hydrocarbons occurs at relatively low temperatures and/or adiabatically, so that coking in the convection section will be suppressed.

The convective section may thus be used to heat the entire hydrocarbon mixture, forming a vapor-liquid mixture. The vaporous hydrocarbons will then be separated from the liquid hydrocarbons, and only the vapors separated will be fed to radiant coils in one or more radiant cells of a single heater.

Multiple heating and separation steps may be used to separate the hydrocarbon mixture into two or more hydrocarbon fractions, if desired. This will permit cracking of each cut optimally, such that the throughput, steam to oil ratios, heater inlet and outlet temperatures and other variables may be controlled at desirable level to achieve the desired reaction results, such as to a desired product profile while limited coking in the radiant coils and associated downstream equipment. The remaining liquid may be removed for use as a fuel and not cracked.

As various cuts, depending upon the boiling point of the hydrocarbons in the mixture, are separated and cracked, the coking in the radiant coils and transfer line exchangers can be controlled. As a result, the run length of the heater may be increased to many weeks, instead of few hours, with higher olefin production.

As noted above, crude and/or heavy feeds with end points higher than 550° C. cannot currently be cracked successfully and economically without separating them, such as via upstream distillation or fractionation into multiple hydrocarbon fractions. In contrast, embodiments herein provide for limited or no use of fractionators to separate the various hydrocarbons for crude cracking. Embodiments herein may have a low capital cost and require less energy than processes requiring extensive fractionation. Further, embodiments herein convert a majority of the crude to produce a high yield of olefins via cracking, and only a small amount of crude, with a less valuable high boiling cut, is sent to fuel without cracking.

By separating the hydrocarbon mixture into various boiling fractions, coking in each section can be controlled, by designing the equipment properly and controlling the operating conditions. In the presence of steam, the hydrocarbon mixture can be heated to high temperatures without coking in the convection section. Additional steam may be added to further vaporize the fluid adiabatically. Therefore, coking in the convection is minimized. As different boiling cuts may be processed in independent coils, the severity for each cut can be controlled. This reduces the coking in the radiant coils and in the TLE. Overall, olefin production is maximized compared to a single cut with heavy tails (high boiling residue) removed. Heavy oil processing schemes or conventional preheating of whole crude without various boiling fractions produces less total olefins than embodiments disclosed herein. In processes disclosed herein, any material with a low boiling point to any end point can be processed at optimal conditions for that material. One, two, three or more individual cuts can be performed for crude and each cut can be processed separately at optimum conditions.

Saturated and/or superheated dilution steam may be added at appropriate locations to vaporize the feed to the extent desired at each stage. Crude separations of the hydrocarbon mixture are performed, such as via a flash drum or a separator having minimal theoretical stages, to separate the hydrocarbons into various cuts. Heavy tails, if processed in the radiant coil, can employ crude separation or a slightly sophisticated tower approach to reduce the carry-over of liquids in the vapor.

The hydrocarbon mixture may be preheated with waste heat from process streams, including effluents from the cracking process or flue gas from the pyrolysis reactor/ heater. Alternatively crude heaters can be used for preheating. In such cases, to maximize thermal efficiency of the pyrolysis reactor, other cold fluids (like boiler feed water (BFW) or air preheat or economizer) can be employed as the uppermost cold sinks of the convection section.

The process of cracking hydrocarbons in a pyrolysis reactor may be divided into three parts, namely a convection section, a radiant section, and a quench section, such as in a transfer line exchanger (TLE). In the convection section, the feed is preheated, partially vaporized, and mixed with steam. In the radiant section, the feed is cracked (where the main cracking reaction takes place). In the TLE, the reacting fluid is quickly quenched to stop the reaction and control the product mixture. Instead of indirect quenching via heat exchange, direct quenching with oil is also acceptable.

Embodiments herein efficiently utilize the convection section to enhance the cracking process. All heating may be performed in a convection section of a single reactor in some embodiments. In some embodiments, crude enters the top row of the convection bank and is preheated, with hot flue gas generated in the radiant section of the heater, at the operating pressure to medium temperatures without adding any steam. The outlet temperatures typically vary from 150° C. to 400° C., depending upon the crude and throughput. At these conditions, 5 to 70% of the crude may be vaporized. For example, the outlet temperature of this first heating step may be such that naphtha (having a normal boiling point of up to about 200° C.) is vaporized. Because the hydrocarbon mixture is preheated with hot flue gas generated in the radiant section of the heater, limited temperature variations and flexibility in the outlet temperature can be expected.

The preheated hydrocarbon mixture enters a flash drum for separation of the vaporized portion from the unvaporized portion. The vapors may go to further superheating, mixed with dilution steam, and then fed to the radiant coil for cracking. If sufficient material is not vaporized, superheated dilution steam can be added to the fluid in the drum. If sufficient material has vaporized, then cold (saturated or mildly superheated) steam can be added to the vapor. Superheated dilution steam (4) can also be used instead of cold steam for a proper heat balance.

The naphtha cut (or light hydrocarbon fraction) and dilution steam mixture is further superheated in the convection section and enters the radiant coil. The radiant coil can be in a different cell, or a group of radiant coils in a single cell can be used to crack the naphtha fraction. The amount of dilution steam can be controlled to minimize the total energy. Typically, the steam to light hydrocarbon fraction is controlled at a steam to oil ratio of about 0.5 w/w, where any value from 0.2 w/w to 1.0 w/w is acceptable, such as from about 0.3 w/w to about 0.7 w/w.

The liquid (not vaporized) in the flash drum may be mixed with small amounts of dilution steam and further heated in the convection section. The S/O (steam to oil ratio) for this coil can be about 0.1 w/w, where any value from 0.05 w/w to 0.4 w/w may be acceptable. As this steam will also be heated along with crude, there is no need to inject superheated steam. Saturated steam is adequate. There is no harm in injecting superheated steam in place of saturated steam, however. The superheated steam may also be fed to the second flash drum. This drum can be a simple vapor/liquid separating drum or more complex like a tower with internals. No such elaborate design is required for drum. For most crude the end boiling point is high and it will never be vaporized at the outlet of this coil. Typical outlet temperature is 400° C., such as from about 300° C. to about 500° C.). The outlet temperature will be chosen to minimize coking in this coil. The amount of steam added to stream is such that minimum dilution flow is used and maximum outlet temperature is obtained without coking. Since some steam is present, coking is suppressed. For high coking crudes, higher steam flow is preferred.

Superheated steam may be added to the drum and will vaporize the hydrocarbon mixture further. The vapor is further superheated in the convection coil and enters the radiant coil. To avoid any condensation of vapors in the line, a small amount of superheated dilution steam can be added to the outlet of the drum (vapor side). This will avoid condensing of heavy material in the lines, which may eventually turn into coke. The drum can be designed to accommodate this feature also. In some embodiments, a heavy oil processing system ("HOPS") tower can be used, accounting for the condensing heavy materials.

The unvaporized liquid can be further processed or sent to fuel. If unvaporized liquid is further processed, the HOPS tower may preferentially be used. If the unvaporized liquid is sent to fuel, the unvaporized, hot, liquid may be exchanged with other cold fluids, such as the hydrocarbon feedstock or first liquid fraction, for example, maximizing energy recovery. Alternatively, the unvaporized liquid may be used in other refinery processes, such as a delayed coker or upgraded, such as in an LC-FINING process (available from Lummus Technology, Inc., Woodlands, Tex.), to produce higher value products. Additionally, heat energy available in this stream may be used to preheat other process streams or to generate steam.

The radiant coil technology can be any type with bulk residence times ranging from 90 milliseconds to 1000 milliseconds with multiple rows and multiple parallel passes and/or split coil arrangements. They can be vertical or horizontal. The coil material can be high strength alloys with bare and finned or internally heat transfer improved tubes. The heater can consist of one radiant box with multiple coils and/or two radiant boxes with multiple coils in each box. The radiant coil geometry and dimensions and the number of coils in each box can be the same or different. If cost is not a factor, multiple stream heaters/exchangers can be employed.

Following cracking in the radiant coils, one or more transfer line exchangers may be used to cool the products very quickly and generate (super) high pressure steam. One or more coils may be combined and connected to each exchanger. The exchanger(s) can be double pipe or multiple shell and tube exchanger.

Instead of indirect cooling, direct quenching can also be used. For such cases, oil may be injected at the outlet of the radiant coil. Following the oil quench, a water quench can also be used. Instead of oil quench, an all water quench is also acceptable. After quenching, the products are sent to a recovery section.

FIG. 1 illustrates a simplified process flow diagram of one cracking system according to embodiments herein. A fired tubular furnace 1 is used for cracking hydrocarbons to ethylene and other olefinic compounds. The fired tubular furnace 1 has a convection section or zone 2 and a cracking section or zone 3. The furnace 1 contains one or more process tubes 4 (radiant coils) through which a portion of the hydrocarbons fed through hydrocarbon feed line 22 are cracked to produce product gases upon the application of heat. Radiant and convective heat is supplied by combustion of a heating medium introduced to the cracking section 3 of the furnace 1 through heating medium inlets 8, such as hearth burners, floor burners, or wall burners, and exiting through an exhaust 10.

The hydrocarbon feedstock, such as a whole crude or a hydrocarbon mixture including hydrocarbons boiling from naphtha range hydrocarbons to hydrocarbons having a normal boiling point temperature greater than 450° C., may be introduced to a heating coil 24, disposed in the convective section 2 of the pyrolysis heater 1. For example, hydrocarbons having a normal boiling temperature greater than 475° C., greater than 500° C., greater than 525° C., or greater than 550° C. may be introduced to heating coil 24. In the heating coil 24, the hydrocarbon feedstock may be partially vaporized, vaporizing the lighter components in the hydrocarbon feedstock, such as naphtha range hydrocarbons. The heated hydrocarbon feedstock 26 is then fed to a separator 27 for separation into a vapor fraction 28 and a liquid fraction 30.

Steam may be supplied to the process via flow line 32. Various portions of the process may use low temperature or saturated steam, while others may use high temperature superheated steam. Steam to be superheated may be fed via flow line 32 into heating coil 34, heated in the convection zone 2 of the pyrolysis heater 1, and recovered via flow line 36 as superheated steam.

A portion of the steam may be fed via flow line 40 and mixed with vapor fraction 28 to form a steam/hydrocarbon mixture in line 42. The steam/hydrocarbon mixture in stream 42 may then be fed to a heating coil 44. The resulting superheated mixture may then be fed via flow line 46 to a cracking coil 4 disposed in a radiant zone 3 of the pyrolysis heater 1. The cracked hydrocarbon product may then be recovered via flow line 12 for heat recovery, quenching, and product recovery.

The liquid fraction 30 may be mixed with steam 50 and fed to heating coil 52 disposed in the convective zone 2 of pyrolysis reactor 1. In heating coil 52, the liquid fraction may be partially vaporized, vaporizing the remaining lighter components in the hydrocarbon feedstock, such as mid to gas oil range hydrocarbons. The injection of steam into the liquid fraction 30 may help prevent formation of coke in heating coil 52. The heated liquid fraction 54 is then fed to a separator 56 for separation into a vapor fraction 58 and a liquid fraction 60.

A portion of the superheated steam may be fed via flow line 62 and mixed with vapor fraction 58 to form a steam/hydrocarbon mixture in line 64. The steam/hydrocarbon mixture in stream 64 may then be fed to a heating coil 66. The resulting superheated mixture may then be fed via flow line 68 to a cracking coil 4 disposed in a radiant zone 3 of the pyrolysis heater 1. The cracked hydrocarbon product may then be recovered via flow line 13 for heat recovery, quenching, and product recovery.

Superheated steam can be injected via flow lines 72, 74 directly into separators 27, 56, respectively. The injection of superheated steam into the separators may reduce the partial pressure and increase the amount of hydrocarbons in the vapor fractions 28, 58.

In addition to heating the hydrocarbon and steam streams, the convection zone 2 may be used to heat other process streams and steam streams, such as via coils 80, 82, 84. For example, coils 80, 82, 84 may be used to heat BFW (Boiler feed water) and preheating SHP (super high pressure) steam, among others.

The placement and number of coils 24, 52, 34, 44, 66, 80, 82, 84 can vary depending upon the design and the expected feedstocks available. In this manner, convection section may be designed to maximize energy recovery from the flue gas. In some embodiments, it may be desired to dispose superheating coil 44 at a higher flue gas temperature location than superheating coil 66. Cracking of the lighter hydrocarbons may be carried out at higher severity, and by locating the superheating coils appropriately, cracking conditions may be enhanced or tailored to the specific vapor cut.

Figure 4:
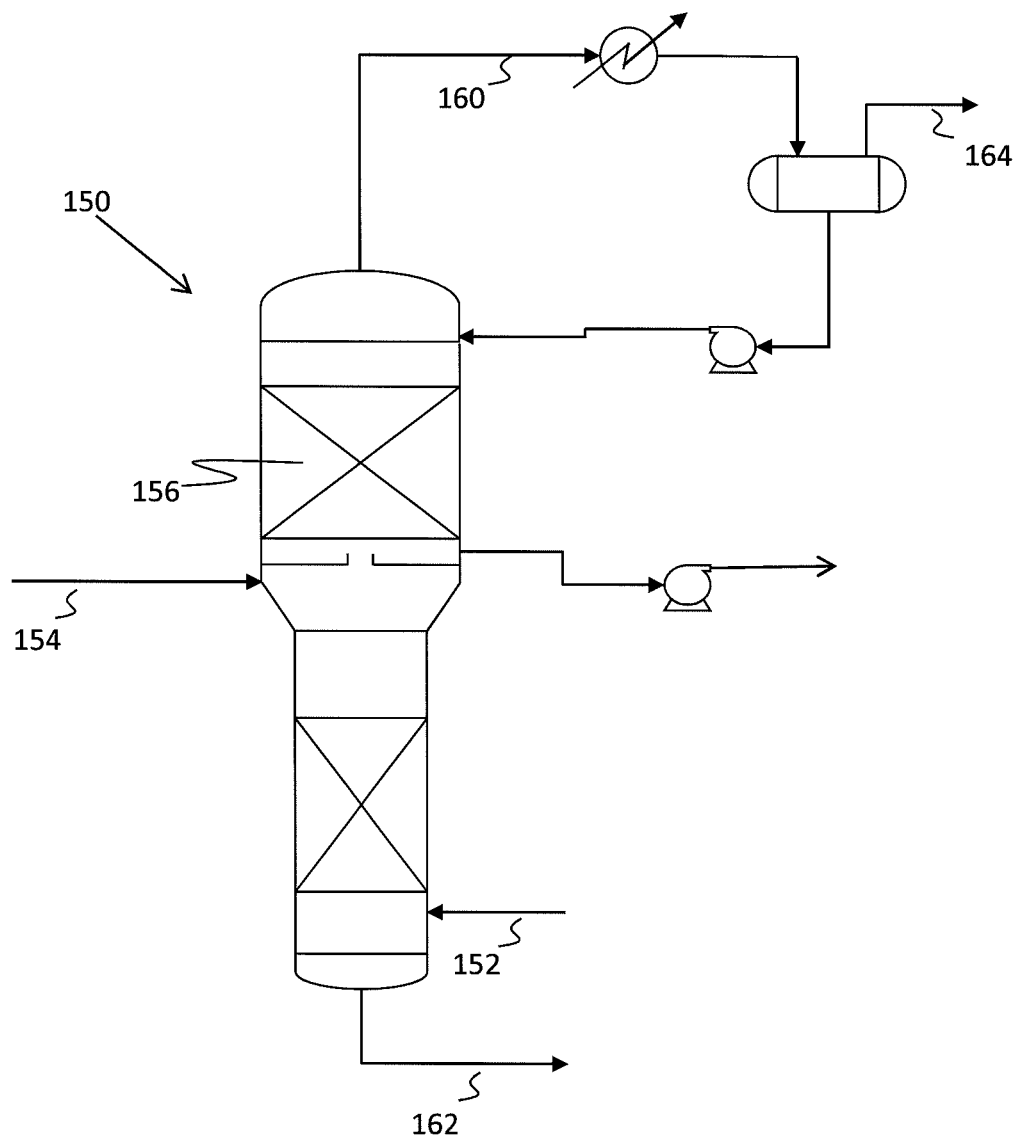
FIG. 4 is a simplified process flow diagram of a HOPS tower useful with the systems for cracking hydrocarbon mixtures according to embodiments herein.

In some embodiments, first separator 27 may be a flash drum, and second separator 56 may be a heavy oil processing system (HOPS) tower, as illustrated in FIG. 4, described below.

While not illustrated in FIG. 1, additional hydrocarbons in liquid fraction 60 may be volatilized and cracked, maximizing olefin recovery of the process. For example, liquid fraction 60 may be mixed with steam, forming a steam/oil mixture. The resulting steam/oil mixture may then be heated in the convection zone 2 of pyrolysis reactor 1 to vaporize a portion of the hydrocarbons in the steam/oil mixture. The heated stream may then be fed to a third separator to separate the vapor fraction, such as vacuum gas oil range hydrocarbons, from the liquid fraction. Superheated steam may also be introduced to the separator to facilitate separations, as well as to the recovered vapor fraction to prevent condensation in the transfer lines prior to introducing the vapor fraction to cracking coils to produce olefins. The liquid fraction recovered from the separator may include the heaviest boiling components of the hydrocarbon mixture 22, such as hydrocarbons having a normal boiling point temperature of greater than 550° C.

The configuration of FIG. 1 provides significant advantages over the traditional process of pre-fractionating the entirety of the mixed hydrocarbon feedstock into separately processed fractions. Additional process flexibility, such as the ability to process widely variable feedstocks, may be attained with the embodiment illustrated in FIG. 2.

Figure 2:
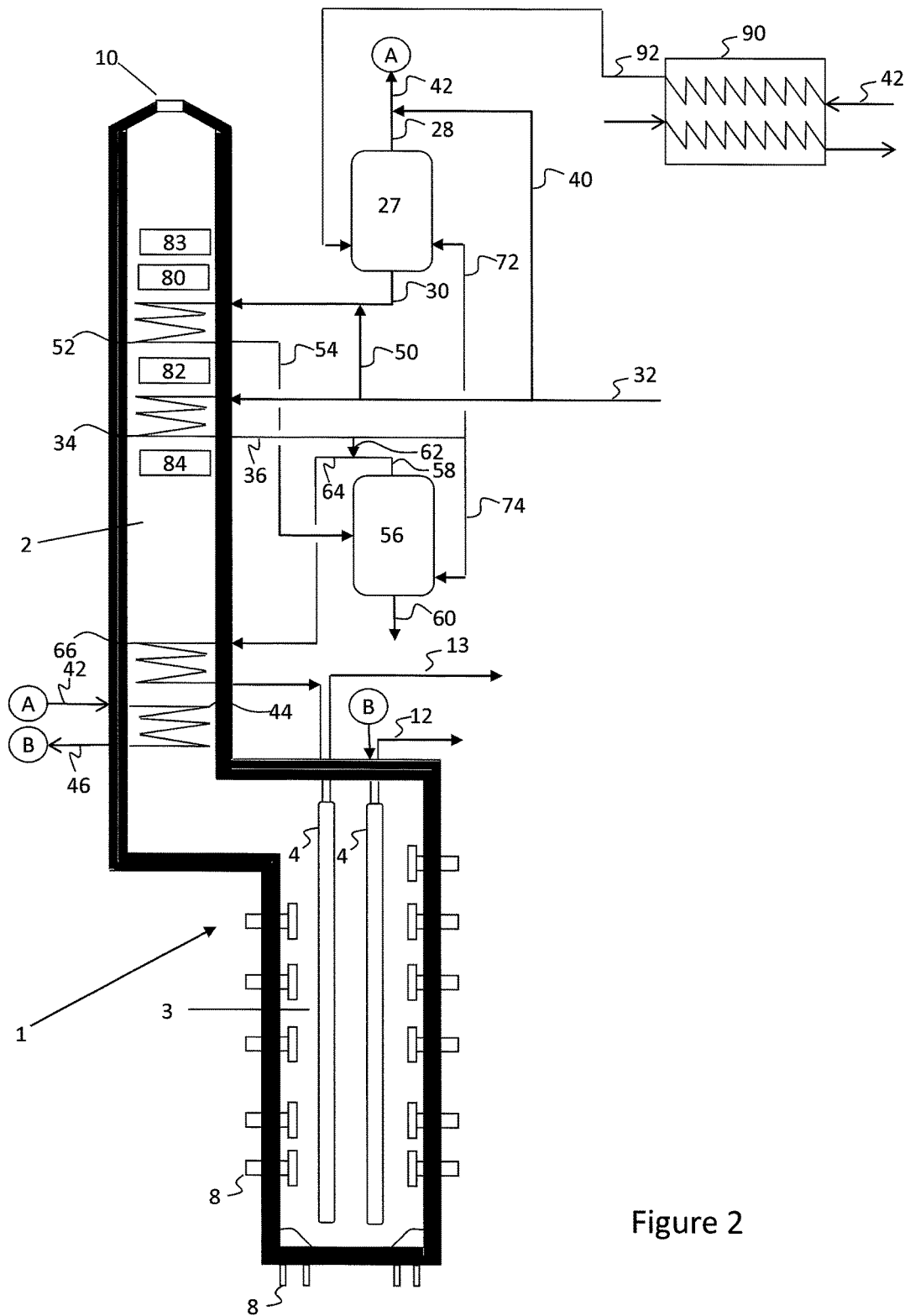
FIG. 2 is a simplified process flow diagram of a system for cracking hydrocarbon mixtures according to embodiments herein.

As illustrated in FIG. 2, where like numerals represent like parts, a mixed hydrocarbon feed 42 may be fed to a heater 90. In heater 90, the hydrocarbon feed may be contacted in indirect heat exchange to increase a temperature of the hydrocarbon feed 42, resulting in a heated feed 92. Heated feed 92 may remain a liquid or may be partially vaporized.

Heated feed 92 may then be introduced to separator 27 to separate lighter hydrocarbons from heavier hydrocarbons. Steam 72 may also be introduced to separator 27 to increase the volatilization of the lighter hydrocarbons. The vapor fraction 28 and liquid fraction 30 may then be processed as described above with respect to FIG. 1, cracking two or more vapor fractions to produce olefins and recovering a heavy hydrocarbon fraction containing hydrocarbons having very high normal boiling points, such as greater than 550° C.

When crude preheating is done externally in an exchanger or in a preheater, as shown in FIG. 2, economizers or BFW coils 83 can occupy the top row(s) of convection section 2. To improve efficiency further, flue gas from two or more heaters can be collected and a combined flue gas can be used to recover additional heat, such as by preheating the feed, preheating the air, low pressure steam generation or heating other process fluids.

Steam has a very low heat capacity, and the heat of vaporization of oil is also significant. Further, the heat energy available in the convection zone of a pyrolysis reactor is not infinite, and the multiple tasks of volatilizing the hydrocarbon feed, superheating steam, and superheating the hydrocarbon/steam mixtures to the radiant coils, may result in rejection of a high amount of high boiling material. A separate heater may be used to preheat the hydrocarbon feedstock and/or dilution steam, resulting in the overall process having a higher degree of flexibility in processing hydrocarbon mixtures having both low and high amounts of heavier hydrocarbons and improving the overall olefin yield from the hydrocarbon mixture.

Figure 3:
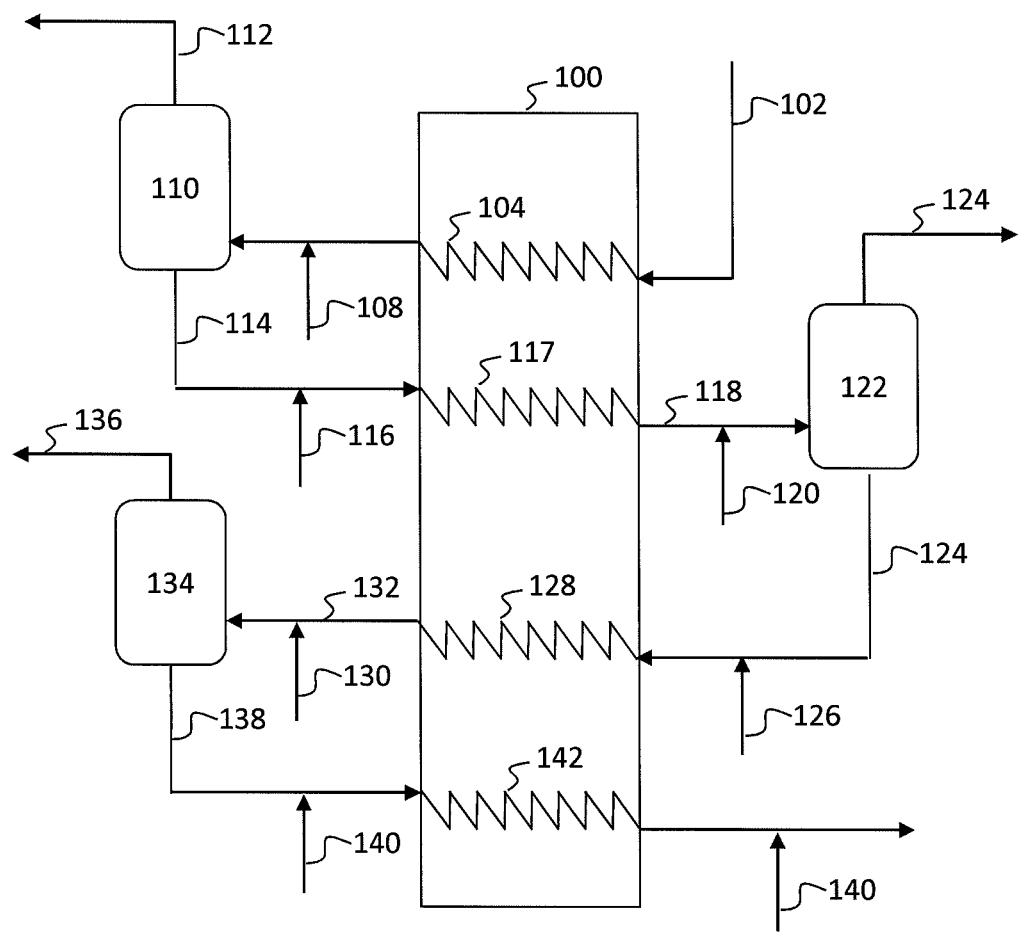
FIG. 3 is a simplified process flow diagram of a portion of a system for cracking hydrocarbon mixtures according to embodiments herein.

This concept is extended in FIG. 3, where a dedicated heater 100 is used to preheat only the hydrocarbon feedstock. Heater 100 preferably does not crack any feed to olefins; rather, it takes the role of the convection section heating as described above.

Crude 102 is fed to a heating coil 104 and preheated in heater 100 to a relatively low temperature. The heated feed 106 is then mixed with steam 108, which may be dilution steam or superheated dilution steam. The preheating and steam contact may vaporize hydrocarbons having a normal boiling point of about 200° C. and less (i.e., a naphtha fraction). The volatilized hydrocarbons and steam may then be separated from non-volatilized hydrocarbons in drum 110, recovering a vapor fraction 112 and a liquid fraction 114. The vapor fraction 112 may then be further diluted with steam, if necessary, superheated in a convection section and sent to radiant coils of a pyrolysis reactor (not shown).

Liquid fraction 114 may be mixed with dilution steam 116, which may be a saturated dilution steam, fed to heating coil 117 and heated in the fired heater 100 to moderate temperatures. The heated liquid fraction 118 may then be mixed with superheated dilution steam 120 and the mixture fed to flash drum 122. Hydrocarbons boiling in the range from about 200° C. to about 350° C. are vaporized and recovered as a vapor fraction 124. The vapor fraction 124 may then be superheated and sent to a radiant section of a pyrolysis reactor (not shown).

The liquid fraction 126 recovered from flash drum 122 is again heated with saturated (or superheated) dilution steam 126, and passed through coils 128 and further superheated in the fired heater 100. Superheated dilution steam 130 may be added to the heated liquid/vapor stream 132 and fed to separator 134 for separation into a vapor fraction 136 and a liquid fraction 138. This separation will cut a 350° C. to 550° C. (VGO) portion, recovered as a vapor fraction 136, which may be superheated with additional dilution steam, if required, and sent to a radiant section of a pyrolysis reactor (not shown).

In some embodiments, separator 134 may be a flash drum. In other embodiments, separator 134 may be a HOPS tower. Alternatively, separation system 134 may include both a flash drum and a HOPS tower, where vapor fraction 136 may be recovered from a flash drum and is then further heated with dilution steam and fed to a HOPS tower. Where a HOPS unit is used, only vaporizable material will be cracked. Unvaporized material may be recovered and sent to fuel, for example. Additional dilution steam will be added to the vapor before sending it to a radiant section of a pyrolysis reactor (not shown). In this manner, with a separate fired heater, many cuts are possible and each cut can be optimally cracked.

For each of the embodiments described above, a common heater design is possible. To increase the thermal efficiency of such a heater, the top row (cold sink) can be any low temperature fluid or BFW or economizer, such as shown in FIG. 2. The heating and superheating of the fluids with or without steam can be done in the convection section or in the radiant section or in the both sections of the fired heater. Additional superheating is done in the convection section of the cracking heater. In both heaters maximum heating of the fluid should be limited to temperatures lower than the coking temperatures of the crude, which for most crudes will be around 500° C. or lower. At higher temperatures, sufficient dilution steam will be present to suppress coking.

Dilution steam can also be superheated so that the energy balance of the cracking heater does not affect the cracking severity significantly. Typically dilution steam is superheated in the same heater (called integral) where the feed is cracked. Alternatively the dilution steam can be superheated in separate heaters. Integral or separate dilution steam super heater depends upon the energy available in the flue gas. When the heavy liquid 138 is further processed and cracked, dilution steam 140 may be added to prior to and/or after additional heating in coil 142, and a HOPS tower may also be used to ensure processing and recovery of a vapor phase, limiting the amount of coke precursors.

As noted above, the mixed hydrocarbon feed may be heated to more than 500° C. to vaporize the crude oil or hydrocarbon mixture. Heat energy available in the flue gas may not be sufficient to heat all portions of the feedstock. It is likely sufficient for light crudes, but as noted above, a high amount of high boiling material may have to be rejected as fuel. The schemes of FIGS. 2 and 3 may be used to flexibly handle any crude, and only a small portion (residue boiling above 550° C.) will be sent to the fuel oil pool. Therefore olefin production (C2H4+C3H6) for any crude will be higher when processed according to embodiments herein. Crude utilization to cracking will be high. When crude oil cracking is carried out in many heaters (instead of one or two in a plant), a single heater to preheat the crude may be economical.

A simple sketch of a HOPS tower 150 is shown in FIG. 4. Various modifications of this scheme are possible. Superheated dilution steam 152 is added to hot liquid 154, and a separation zone 156 including 2 to 10 theoretical stages are used to separate the vaporizable hydrocarbons from the non-vaporizable hydrocarbons. By this process, carryover of fine droplets to the overhead fraction 160 is reduced, as high boiling carryover liquids in the vapor will cause coking. The heavy, non-vaporizable hydrocarbons are recovered in bottoms fraction 162, and the vaporizable hydrocarbons and dilution steam are recovered in overhead product fraction 164. HOPS tower 150 may include some internal distributors with and/or without packing. When the HOPS tower is used, vapor/liquid separation may be nearly ideal. The end point of the vapor is nearly identifiable and any liquid carry over in the vapor phase can be minimized. While this is more expensive than a flash drum, the benefits of reduced coking sufficiently outweigh the added expense.

Except the heavy residue (i.e., those including 550° C.+ hydrocarbons), all cuts may be cracked in the same reactor in different coils. In this manner, a single heater can be used for different fractions with boiling points below 550° C. and optimum conditions for each cut can be achieved.

When heavy material (550° C.+) is also cracked, a separate heater (not shown) may be used. For example, a heavies stream, such as streams 60, 138, may be fed to a HOPS tower. In this tower, tail end or heavy boiling materials (5 to 20% of this cut) which are known coke precursors are removed. The S/O of this fraction will be high. This material on cracking produces only a small amount of olefins. Since this has a high coking tendency, it is recommended to crack it in a separate heater (or in few coils in a cell). The fouling tendency of the TLE is also high. Therefore direct quench (oil or oil followed by water) is recommended. When the economics is not attractive, heat energy may be recovered from the heavies cut, and then this cut can be processed in the refinery instead of cracking to produce olefins, such as in a delayed coker or LC-FINING process, as noted above. This cut can also be processed in the same heater as split cracking mode. Since high S/O ratios and low severity with direct quench is used, a separate heater is preferred. If capital cost is not a factor, a single heater for all fractions can be used.

EXAMPLES

Example 1

Arabian Crude

Figure 5:
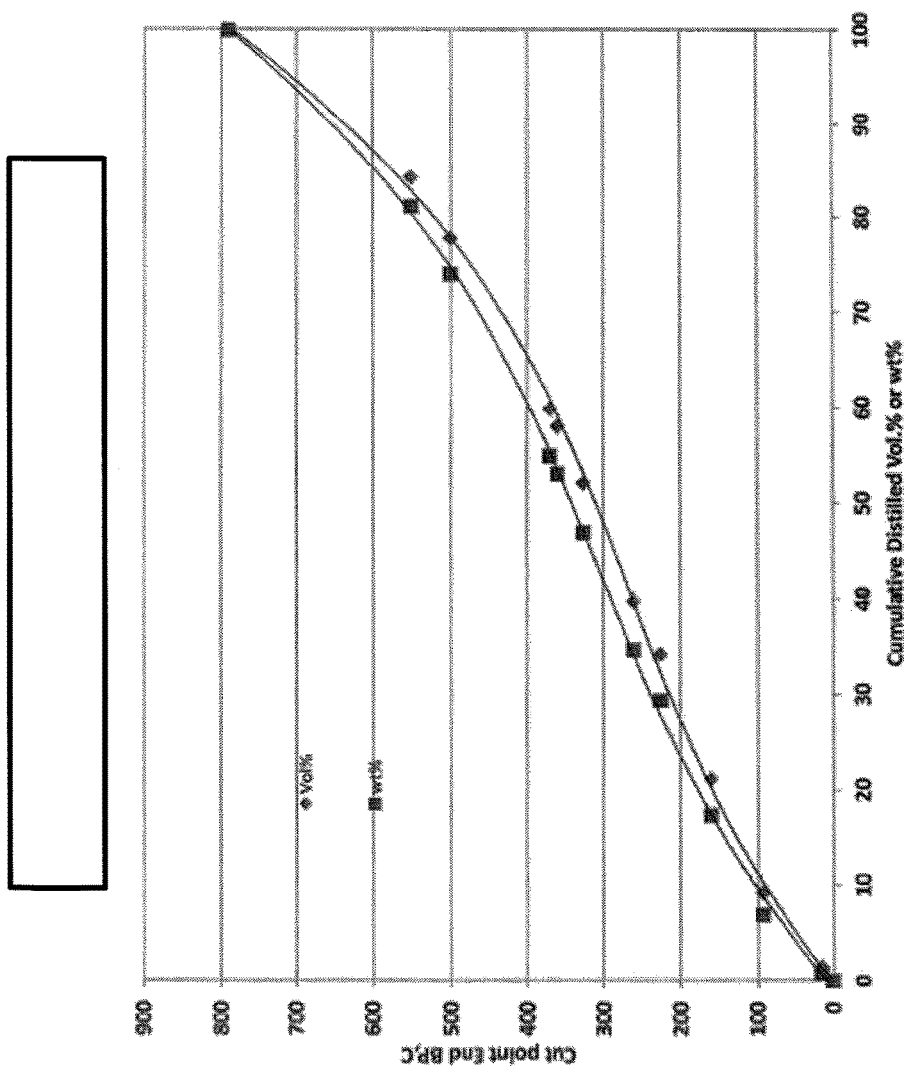
FIG. 5 is a distillation curve of a hydrocarbon mixture that may be cracked to form olefins according to embodiments herein.

Table 1 shows the calculated yields obtained for crude cracking. All calculations are based on a theoretical model. Assuming run length (even few hours) is not a factor, yields at high severity are shown (Case 1) for light Arabian crude. The whole crude is cracked. The TBP distillation curve of the light Arabian crude is shown in FIG. 5. The crude gravity is 0.8581.

In Case 2, the crude is cut into three fractions according to embodiments herein, including an Initial Boiling Point to 225° C. cut, a 225° C. to 550° C. cut, and a 550° C.+ cut, as described above. Each fraction is then cracked separately.

Case 3 is a simple approach, where the complete crude is vaporized with added steam (i.e., no vapor/liquid separation). For the 1-cut calculations (Case 3), 550° C.+ material is removed.

As shown in Table 1, embodiments herein may result in increased olefin production with lower steam consumption.

TABLE 1

| Case | 1 | 2 | 3 |
|---|---|---|---|
| FEED | Crude | 3 Cuts | 1 Cut |
| Specific Gravity | 0.8581 | 0.854314 | 0.85626 |
| COP, PSIA | 25.00 | 25.00 | 25.00 |
| Average Steam to Oil Ratio S/O, w/w | 1.20 | 0.94 | 1.10 |
| SEVERITY | High | High | High |
| YIELDS, WT % | | | |
| H2 | 0.60 | 0.69 | 0.59 |
| CH4 | 10.00 | 11.44 | 8.82 |
| C2H2 | 0.15 | 0.45 | 0.45 |
| C2H4 | 18.00 | 23.10 | 20.70 |
| C2H6 | 1.00 | 2.48 | 2.52 |
| C3H4 | 0.40 | 0.57 | 0.54 |
| C3H6 | 13.80 | 13.08 | 12.51 |
| C3H8 | 0.30 | 0.20 | 0.14 |
| C4H6 | 2.70 | 3.98 | 3.96 |
| C4H8 | 2.90 | 3.82 | 3.51 |
| C4H10 | 0.10 | 0.12 | 0.14 |
| C5'S | 3.50 | 3.54 | 3.60 |
| C6-C8 Non-Aromatic | 3.00 | 1.85 | 1.08 |
| BENZENE | 2.20 | 5.68 | 5.22 |
| TOLUENE | 1.10 | 2.81 | 1.71 |
| Xylenes + Ethylbenzene | 2.20 | 1.83 | 1.35 |
| STYRENE | 0.50 | 0.66 | 0.65 |
| C9-400 F | 4.50 | 2.85 | 3.06 |
| Fuel Oil | 33.05 | 20.86 | 29.47 |
| TOTAL | 100.00 | 100.00 | 100.00 |

Example 2

Agbami Crude (Nigeria)

Similar comparisons to those in Example 1 are made for Agbami crude from Nigeria. The crude had the properties and distillation curve as shown in Table 2.

TABLE 2

| API Gravity | 42.3 |
|---|---|
| Sulfur, wt % | 0.04 |
| MCRT, wt % | 0.67 |
| Va + Ni, ppm | 2.1 |
| TBP Distillation | ° C. |
| 5 vol % | 0.4 |
| 10 vol % | 58 |
| 30 vol % | 133 |
| 50 vol % | 210 |
| 70 vol % | 291 |
| 90 vol % | 402 |
| 95 vol % | 452 |
| Residue (570° C.+) | 1.7% |

Pyrolysis yields for cracking the crude, calculated based on a theoretical model similar to that used in Example 1, are shown in Table 2. Four cases were studied for this example, including whole crude, 1-cut, 2-cuts, and 3-cuts.

In the 1-cut case, 530° C.+ material is removed. This residue is about 4 wt % of the crude. For the 2-cut case, the naphtha (up to 200° C.) material is cracked in a separate coil and the remainder (up to 530° C.) is cracked in another coil or heater. For the 3-cut case, naphtha, AGO (200° C. to 350° C.), and VGO (350° C. to 530° C.) are cracked in separate coils or heaters. For all cases except the crude, 530° C.+ residue is not cracked, but blended with fuel oil. The blended yields for each case (crude, 1-cut, 2-cuts, and 3-cuts) are shown in Table 3.

TABLE 3

| FEED | Crude | 3 Cuts | 2 Cuts | 1 Cut |
|---|---|---|---|---|
| COP, PSIA | 25.00 | 25.00 | 25.00 | 25.00 |
| Average S/O, w/w | 1.00 | 0.65 | 0.66 | 0.86 |
| SEVERITY | High | High | High | High |
| YIELDS, WT % | | | | |
| H2 | 0.56 | 0.76 | 0.75 | 0.56 |
| CH4 | 9.10 | 12.22 | 12.09 | 9.12 |
| C2H2 | 0.35 | 0.53 | 0.51 | 0.34 |
| C2H4 | 23.50 | 26.66 | 26.18 | 24.00 |
| C2H6 | 2.20 | 2.94 | 2.91 | 2.30 |
| C3H4 | 0.55 | 0.75 | 0.69 | 0.58 |
| C3H6 | 12.85 | 13.18 | 13.23 | 12.96 |
| C3H8 | 0.35 | 0.22 | 0.27 | 0.38 |
| C4H6 | 4.00 | 4.67 | 4.59 | 4.03 |
| C4H8 | 4.40 | 3.49 | 3.56 | 4.32 |
| C4H10 | 0.10 | 0.23 | 0.23 | 0.10 |
| C5'S | 3.50 | 2.76 | 3.01 | 3.55 |
| C6-C8 Non-Aromatic | 2.50 | 2.06 | 2.01 | 1.92 |
| BENZENE | 4.70 | 6.59 | 6.69 | 4.80 |
| TOLUENE | 2.35 | 3.34 | 3.34 | 2.40 |
| Xylenes + Ethylbenzene | 1.35 | 1.28 | 1.34 | 1.34 |
| STYRENE | 0.72 | 0.83 | 0.83 | 0.70 |
| C9-400 F | 3.10 | 2.33 | 2.38 | 3.07 |
| Fuel Oil | 23.82 | 15.16 | 15.40 | 23.53 |
| TOTAL | 100.00 | 100.00 | 100.00 | 100.00 |

As described above, embodiments herein may provide for flexibly processing whole crudes and other hydrocarbon mixtures containing high boiling coke precursors. Embodiments herein may advantageously reduce coking and fouling during the pre-heating, superheating, and the cracking process, even at high severity conditions. Embodiments herein may attain desirable yields, while significantly decreasing the capital and energy requirements associated with pre-fractionation and separate processing of the fractions in multiple heaters.

Suppression of coking throughout the cracking process according to embodiments herein while increasing olefin yield provides significant advantages, including increased run lengths (decreased down time) and the ability to handle feeds containing heavy hydrocarbons. Further, significant energy efficiencies may be gained over conventional processes including distillative separations and separate cracking reactors.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for thermally cracking a hydrocarbon mixture to produce olefins, the process comprising:
   heating a hydrocarbon mixture in a heater to vaporize a portion of the hydrocarbons in the hydrocarbon mixture and form a heated hydrocarbon mixture;
   separating the heated hydrocarbon mixture, in a first separator, into a first vapor fraction and a first liquid fraction;
   heating the first liquid fraction in a convection zone of a pyrolysis reactor to vaporize a portion of the hydrocarbons in the first liquid fraction and form a second heated hydrocarbon mixture;

separating the second heated hydrocarbon mixture, in a second separator, into a second vapor fraction and a second liquid fraction;

mixing steam with the first vapor fraction, superheating the resulting mixture in the convection zone, and feeding the superheated mixture to a first radiant coil in a radiant zone of the pyrolysis reactor; and mixing steam with the second vapor fraction, superheating the resulting mixture in the convection zone, and feeding the superheated mixture to a second radiant coil in a radiant zone of the pyrolysis reactor.

2. The process of claim 1, further comprising mixing the first liquid fraction with steam prior to heating the first liquid fraction in the convection zone.

3. The process of claim 1, further comprising feeding steam to at least one of the first and second separators.

4. The process of claim 1, further comprising:
mixing the second liquid fraction with steam to form a steam/oil mixture;
heating the steam/oil mixture in the convection zone of the pyrolysis reactor to vaporize a portion of the hydrocarbons in the steam/oil mixture and form a third heated hydrocarbon mixture;
separating the third heated hydrocarbon mixture, in a third separator, into a third vapor fraction and a third liquid fraction;
mixing steam with the third vapor fraction, superheating the resulting mixture in the convection zone, and feeding the superheated mixture to a third radiant coil in a radiant zone of the pyrolysis reactor.

5. The process of claim 4, further comprising
withdrawing a portion of a stream steam and using the portion as the steam for mixing with at least one of the hydrocarbon mixture, the first liquid fraction, the first vapor fraction, and the second liquid fraction;
superheating a remaining portion of the steam stream in the convection zone of the pyrolysis reactor; and
feeding the superheated steam to at least one of the first separator, the second separator, and the third separator.

6. The process of claim 5, further comprising using a portion of the superheated steam as the steam form mixing with the third vapor fraction.

7. The process of claim 4, wherein a temperature of a flue gas in the convection zone is higher when heating the second liquid fraction than when heating the first liquid fraction.

8. The process of claim 7, wherein a temperature of the flue gas in the convection zone is higher when superheating the first, second, and third vapor fractions than when heating the second liquid fraction.

9. The process of claim 1, wherein the hydrocarbon mixture comprises a whole crude or a hydrocarbon mixture including hydrocarbons having a normal boiling point of at least 550° C.

10. The process of claim 1, further comprising hydroprocessing the hydrocarbon mixture to reduce a content of at least one of nitrogen, sulfur, metals, and Conradson Carbon in the hydrocarbon mixture.

11. The process of claim 1, further comprising recovering heat from the effluent, condensing at least a portion of the effluent, and/or separating the effluent into one or more fractions.

12. The process of claim 1, wherein, within the convection zone, the third indirect heat exchange coil is disposed at a higher temperature region of the convection zone than the fourth indirect heat exchange coil.

13. A process for thermally cracking a hydrocarbon mixture, comprising hydrocarbons boiling from naphtha range hydrocarbons to hydrocarbons boiling at a temperature greater than 550° C., to produce olefins, the process comprising:
heating a hydrocarbon mixture in a convection zone of a pyrolysis reactor to vaporize a portion of the hydrocarbons in the hydrocarbon mixture and form a heated hydrocarbon mixture;
separating the heated hydrocarbon mixture, in a first separator, into a first vapor fraction comprising naphtha range hydrocarbons and a first liquid fraction;
mixing the first liquid fraction with steam to form a first steam/oil mixture;
heating the first steam/oil mixture in the convection zone of the pyrolysis reactor to vaporize a portion of the hydrocarbons in the first steam/oil mixture and form a second heated hydrocarbon mixture;
separating the second heated hydrocarbon mixture, in a second separator, into a second vapor fraction comprising gas oil range hydrocarbons and a second liquid fraction;
mixing steam with the first vapor fraction, superheating the resulting mixture in the convection zone, and feeding the superheated mixture to a first radiant coil in a radiant zone of the pyrolysis reactor; and
mixing steam with the second vapor fraction, superheating the resulting mixture in the convection zone, and feeding the superheated mixture to a second radiant coil in a radiant zone of the pyrolysis reactor.

14. The process of claim 13, further comprising feeding steam to at least one of the first and second separators.

15. The process of claim 13, wherein the first separator comprises a flash drum and wherein the second separator comprises a heavy oil processing system tower.

16. The process of claim 13, further comprising:
mixing the second liquid fraction with steam to form a second steam/oil mixture;
heating the second steam/oil mixture in the convection zone of the pyrolysis reactor to vaporize a portion of the hydrocarbons in the first steam/oil mixture and form a third heated hydrocarbon mixture;
separating the third heated hydrocarbon mixture, in a third separator, into a third vapor fraction comprising vacuum gas oil range hydrocarbons and a third liquid fraction;
mixing steam with the third vapor fraction, superheating the resulting mixture in the convection zone, and feeding the superheated mixture to a third radiant coil in a radiant zone of the pyrolysis reactor.

17. The process of claim 16, further comprising feeding steam to at least one of the first, second, and third separators.

18. The process of claim 16, wherein the first separator comprises a flash drum and wherein the third separator comprises a heavy oil processing system tower.

19. The process of claim 16, wherein the third liquid fraction comprises hydrocarbons boiling at a temperature greater than 550° C.

20. The process of claim 13, further comprising contacting a flue gas of the pyrolysis reactor in indirect heat exchange for the superheating of the first vapor fraction/steam mixture prior to contacting the flue gas in indirect heat exchange for the superheating of the second vapor fraction/steam mixture.

* * * * *

UNITED STATES PATENT AND TRADEMARK OFFICE
CERTIFICATE OF CORRECTION

PATENT NO.        : 10,017,702 B2
APPLICATION NO.   : 14/874755
DATED             : July 10, 2018
INVENTOR(S)       : Kandasamy Meenakshi Sundaram Page 1 of 1

It is certified that error appears in the above-identified patent and that said Letters Patent is hereby corrected as shown below:

In the Claims

Column 15, Claim 12, Line 64, the claim number "1" should read -- 4 --, and

Column 15, Claim 12, Line 66, the word "the" should read -- a --.

Signed and Sealed this
Twenty-sixth Day of March, 2019

Andrei Iancu
*Director of the United States Patent and Trademark Office*